though to United States Patent Office 2,724,653
Patented Nov. 22, 1955

2,724,653
NON-TOXIC INSECTICIDES
Frank L. Todd, Jr., Martin, Tenn.
No Drawing. Application September 13, 1950,
Serial No. 184,705
2 Claims. (Cl. 99—222)

This invention relates to non-toxic insecticides and has for its primary object the provision of an insecticide particularly suitable for use in protecting meats whether home cured or commercially cured and of a type that can safely be applied directly to the meat.

Home cured meat is subject to infestation and resulting heavy loss by skipper flies (Piophila casei), ham beetles (Necrobia rufipes), as well as certain types of tyroglyphid mites and the present insecticide has shown a high degree of effectiveness in controlling, repelling, and killing these insects so that meat of both the home cured and the commercially cured types is given protection for many months by a single application of the compound which is non-toxic and therefore may be applied with perfect safety.

In making my insecticide, I first make a primary formula of:

| | Per cent |
|---|---|
| Piperonyl butoxide (technical) | 10.0 |
| Pyrethrins | 1.0 |
| Kaolin clay | 57.3 |
| Celite 209 | 26.7 |
| Atlas G-1255 | 2.0 |
| Tamol N | 1.0 |
| Ultrasene | 2.0 |
| | 100.0 | and when this has been finely divided it is blended in a standard mixer with sodium nitrate, capsicum and kaolin in the following percentages:

| | Per cent |
|---|---|
| Primary formula | 10 |
| Nitrate of soda | 3 |
| Capsicum | 3 |
| Kaolin clay | 84 |
| | 100 |

The Celite 209 is a diatomaceous earth and therefore an inert carrier. The G-1255 is a polyoxyethylene sorbitol mixed fatty acid ester and hence is a wetting agent for the powder greatly facilitating adsorption of water. The Tamol N is a sodium salt of a condensed naphthalene sulfonic acid and is a dispersing agent for the powder so that the latter remains in finely divided state all thru the water. The ultrasene is a solvent for the active ingredients, the pyrethrins are the active ingredients, the piperonyl butoxide is an excellent activator and the ultrasene is a highly refined petroleum distillate fraction boiling between 390° F. and 490° F. (ASTM method D-86). Chemically, it is a mixture of isoparaffinic and naphthenic (cycloparaffinic) hydrocarbons; the concentration of aromatics being almost nil.

Isopropyl alcohol may be substituted for the ultrasene but is less adaptable for the indicated use. The clay is preferably of the "Barden" grade. The nitrate of soda conditions the surface of the meat for more efficient action of the piperonyl butoxide and pyrethrins. Due to the rapid penetration of the nitrate of soda into the meat, enough of the pyrethrins mixture is carried along with it to serve as a larvacide within the meat.

What I claim is:

1. A non-toxic compound for long term use on meats to prevent injury by skipper flies, ham beetles, mites and other insects; comprising pyrethrins as active agent, piperonyl butoxide and nitrate of soda as a penetrating agent for carrying the active agent into the meat.

2. A non-toxic insecticide for direct application to meats to prevent injury by skipper flies, ham beetles, mites and other insects, comprising:

| | Per cent |
|---|---|
| Nitrate of soda | 3 |
| Capsicum | 3 |
| Kaolin clay | 84 |
| Primary formula | 10 |
| | 100 | in which the primary formula is finely divided and blended with the other ingredients, the primary formula comprising:

| | Per cent |
|---|---|
| Pyrethrins | 1.0 |
| Piperonyl butoxide | 10.0 |
| Sodium salt of a condensed naphthalene sulfonic acid as a dispersing agent | 1.0 |
| Polyoxyethylene sorbitol mixed fatty acid esters as a wetting agent | 2.0 |
| Highly refined petroleum distillate of mixed isoparaffinic and naphthenic (cycloparaffinic) hydrocarbons, boiling between 390° F. and 490° F., as a solvent for the active ingredients | 2.0 |
| Diatomaceous earth | 26.7 |
| Kaolin clay | 57.3 |
| | 100.0 | in which insecticide the pyrethrins are the active ingredients, the piperonyl butoxide is an activator and the nitrate of soda is a penetrating agent carrying with it into the meat the active ingredients.

References Cited in the file of this patent
UNITED STATES PATENTS

| 2,117,478 | Hall | May 17, 1938 |
| 2,196,238 | Werby | Apr. 9, 1940 |

OTHER REFERENCES

McAlister et al., "J. Econ. Ent.," December 1947, vol. 40, No. 6, pages 906 to 909, inclusive.

"Soap and Sanitary Chemicals," November 1948, page 147.

"Baker's Helper," August 5, 1950, page 57.